Aug. 1, 1967     W. J. OLIVER     3,333,466
ARTICULATED DENSITY LOGGING TOOL
Filed Dec. 28, 1964     2 Sheets-Sheet 1
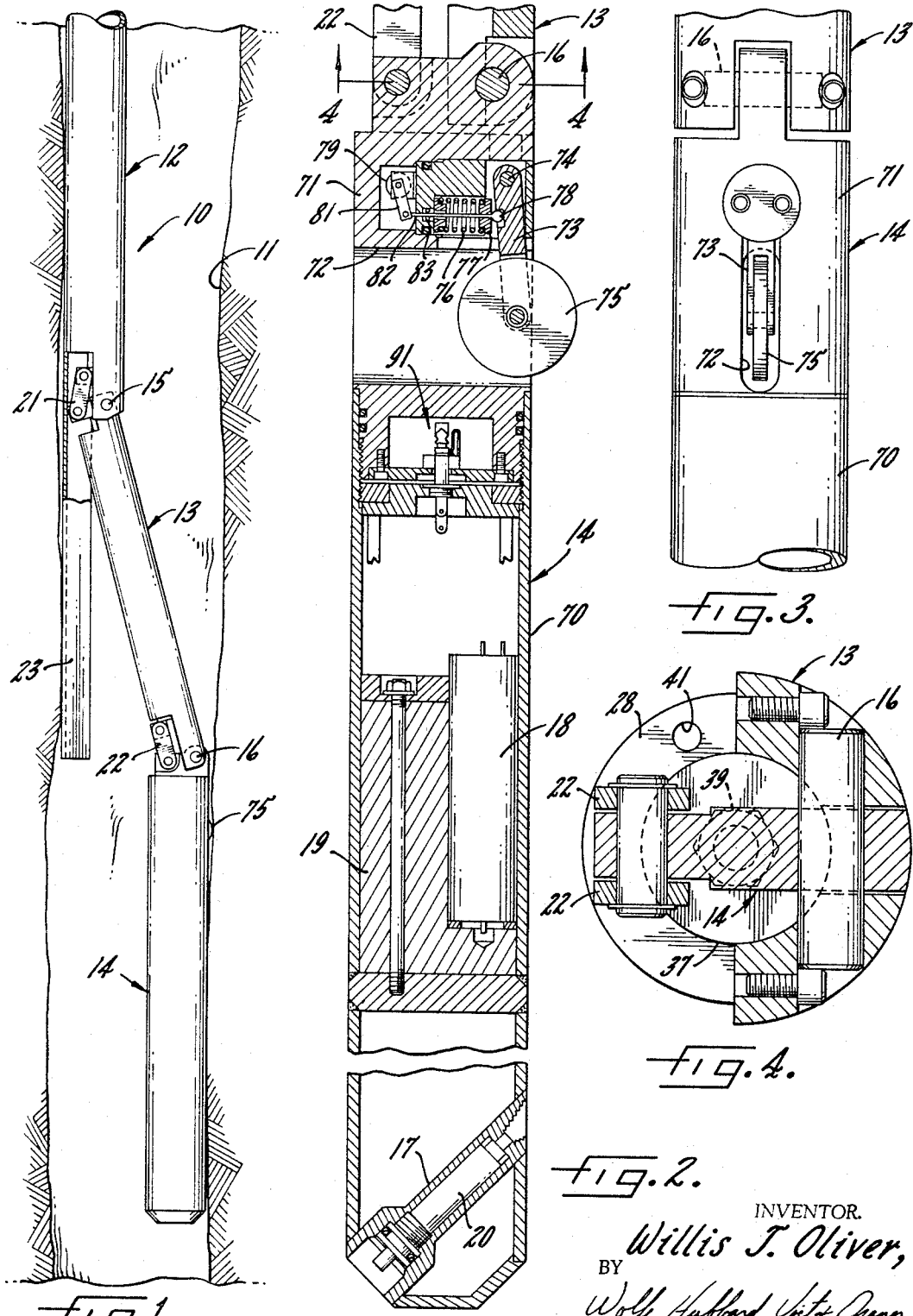
INVENTOR.
Willis J. Oliver,
BY Wolf, Hubbard, Voit & Osann
Attorneys.

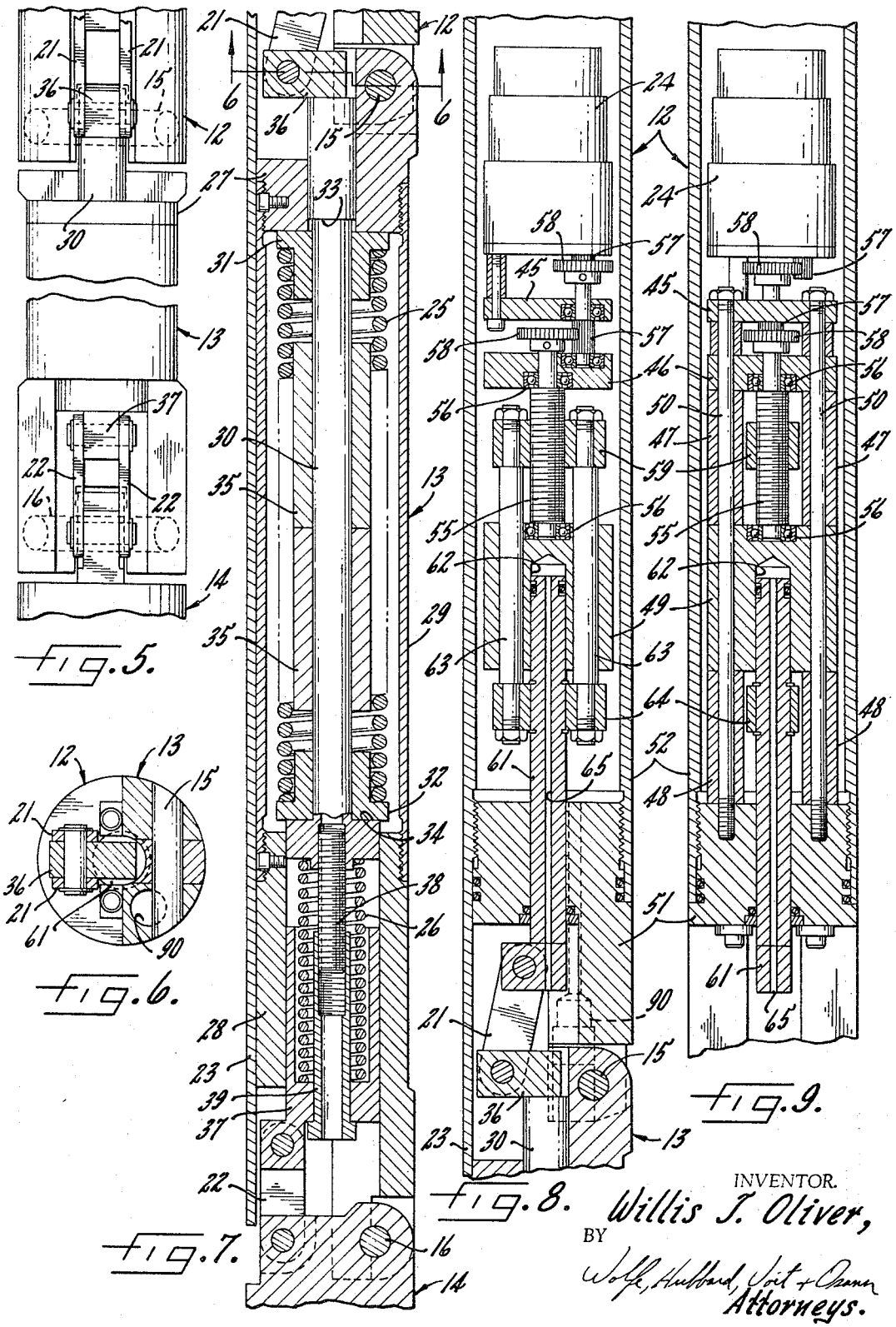

United States Patent Office 3,333,466
Patented Aug. 1, 1967

3,333,466
ARTICULATED DENSITY LOGGING TOOL
Willis J. Oliver, Derrick City, Pa., assignor to Seismograph Service Corporation, Tulsa, Okla., a corporation of Delaware
Filed Dec. 28, 1964, Ser. No. 421,576
13 Claims. (Cl. 73—151)

ABSTRACT OF THE DISCLOSURE

A well logging tool suitable for use with radiation scattering density detection apparatus is described, characterized by an elongate body comprising three articulated members which incorporate a combination of spring and motor means for folding the articulated segments into engagement with opposite sides of the borehole to be logged, the lower of which segments carries the logging detection apparatus.

The invention related generally to well logging tools and more particularly concerns a gamma ray type of density logging tool.

Density determinations of underground formations have been reliably made through the techniques of running a well log with a gamma-gamma tool. Logging tools are usually lowered into a bore hole and pulled up through the formation to be studied. A gamma-gamma tool beams gamma radiation into the wall of the hole and detects the intensity of gamma radiation at a point spaced from the radiation source. The amount of radiation detected depends upon the degree of scattering and reflection of the radiated beam, and this varies with the density of the formation. Since the intensity of the source remains constant, variations in the energy levels recorded by the detector are measures of the formation densities through which the bore hole passes.

For most reliable results, a gamma-gamma density logging tool should be positioned directly against the side wall of the bore hole so as to avoid having radiation "leak" alongside the tool without entering the formation being studied. The problem of holding both the source and the detector against the bore hole wall is mechanically complicated by the need to keep a constant source-detector spacing of about 15 to 20 inches. The spacing must be constant to eliminate a variable affecting the level radiation detected, and the spacing cannot be too close if it is desired to search the undisturbed formation behind the immediate hole wall region whose density is often affected by fracturing incident to drilling the hole.

In view of these requirements, it is an object of the present invention to provide an improved tool for gamma-gamma logging having a body section of fixed length for constant proper spacing of the radiation source and the detector that, in operation, is held firmly against the hole wall through variations in hole width and contour. A collateral object is to provide a tool of this character which can be remotely altered between an operative configuration engaging the bore hole wall and a small diameter, tubular shape which can be readily traversed through a bore hole.

Another object of the invention is to provide a tool as described above in which the source-detector body section is manipulated solely from one end with there being no internal or laterally adjacent positioning mechanism. As a result, the full thickness of the body section is available for containing radiation shielding material and, in operation with the body section riding along the bore hole wall, there are no variations in mass distribution adjacent the source and detector to affect the detected radiation levels.

It is a further object to provide a tool of the above kind with an improved proximity detector capable of reliably sensing any spacing between the tool and the bore hole wall so that appropriate corrections can be made in the resulting log.

Other objects and advantages of the invention will become apparent upon reading the following detailed description and upon reference to the drawings, in which:

FIGURE 1 is a section through a bore hole showing a tool constructed in accordance with the invention in operative position;

FIG. 2 is an enlarged section of the lower portion of the tool shown in FIG. 1;

FIG. 3 is a fragmentary elevation of a portion of the structure shown in FIG. 2;

FIG. 4 is an enlarged section taken approximately along the line 4—4 in FIG. 2;

FIG. 5 is a fragmentary elevation of the intermediate portion of the tool appearing in FIG. 1;

FIG. 6 is a section taken approximately along the line 6—6 in FIG. 7;

FIG. 7 is a fragmentary section taken longitudinally through the intermediate portion of the tool appearing in FIG. 1; and FIGS. 8 and 9 are fragmentary sections taken in right angled planes through the upper portion of the tool shown in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to FIG. 1, there is shown a logging tool 10 constructed in accordance with the invention and disposed in operative position within a bore hole 11. The tool is formed of an elongated cylindrical or tubular body having a base section 12, an intermediate section 13, and an end section 14 all alined and hinged together by a hinge pin 15 between the base and intermediate sections 12, 13 and a hinge pin 16 between the intermediate and end sections 13, 14.

The end section 14 is the instrument carrying section and, in the preferred embodiment, a gamma ray source 20 is removably mounted in a holder 17 at the extreme end of the section. 14 and a gamma ray detector 18 is mounted adjacent the side of the section from which the beam of the source is directed. The detector 18 is preferably of either the scintillation counter or Geiger-Muller type and, in the illustrated construction, the detector is recessed in a radiation shielding lead body 19. It can also be seen that the full remaining interior of the section 14 between the body 19 and the source holder 17 is available for receiving radiation shielding material so as to minimize, if not eliminate, the detection of direct radiation between the source 20 and the detector 18.

In carrying out the invention, sets of links 21 and 22 couple the sections 12–14 at points spaced from the pivot pins 15, 16, and resilient operating forces are exerted through the links 21, 22 urging the intermediate and end sections 13, 14 out of alinement with the base section 12, and the end section 14 toward alinement with the intermediate section 13. That is, with the tool in the operating configuration illustrated in FIG. 1, the links 21 are held under compression so as to exert a counterclockwise torque about the hinge pin 15 that presses the base section 12 against one wall of the bore hole 11 and swings the end section 14 against the opposite wall of the bore hole. The links 22 are also held under compression so that a counterclockwise torque is exerted about the hinge pin 16 that is effective to resiliently hold the entire length of the end section 14 against the bore hole wall. In keeping with the invention, the force exerted through the links 21 is greater than the force exerted through the links 22 so that the base and end sections 12, 14 are held in generally parallel relation when the tool 10 is confined within a bore hole. Stated another way, the stronger torque exerted about the hinge pin 15 holds the upper end of the end section 14 resiliently against the bore hole wall even though the width of the bore hole varies, and the end section resiliently pivots about the hinge pin 16 so that the end section 14 slopes to conform with variations in the sloping sides of the bore hole against which it rides. In this way, both the source 20 and the detector 18 are held closely against the bore hole wall when the tool 10 is logging.

Preferably, a semi-cylindrical cradle member 23 is formed as part of the base section 12 so as to extend generally longitudinally of the base section. The cradle member 23 provides a greater bearing area for the reaction force that develops the torque about the hinge pin 15 and also serves to receive the intermediate section 13.

Further in accordance with the invention, the tool 10 contains a motor 24 (see FIGS. 8 and 9) that is effective to reverse the resilient loading in the links 21 from compression to tension so as to draw the sections of the tool into axial alinement. When so alined, the intermediate section 13 is received within the cradle member 23 and the straightened tool thus defines an elongated tubular body of minimum diameter that can be easily lowered into proper position within a bore hole.

The resilient forces which position the tool sections 12–14 are developed by a primary spring 25 and a secondary spring 26 (see FIG. 7) each positioned within the intermediate section 13 of the tool. The primary spring 25 is preferably helical and compressed between end members 27 and 28 which close a tube 29 to define the body of the intermediate section 13 of the tool. A control shaft 30 is slidably mounted in the end members 27, 28 for movement axially and within the spring 25. The ends of the spring 25 are seated on collars 31 and 32 slidably carried on the control shaft 30 and adapted to engage both the end members 27, 28 and a pair of abutments 33 and 34 formed on the control shaft 30. The collar 31 engages either the end member 27 or the control shaft abutment 33, while the collar 32 engages either the end member 28 or the control shaft abutment 34. In the illustrated construction, cylindrical spring positioners 35 are fitted on the control shaft 30 within the spring 25 to support the midportion of the spring.

The links 21 extend from the base section 12 of the tool and are pivoted on a lug 36 fixed to the end of the control shaft 30. Preferably, the spacing between the end members 27, 28 is approximately equal to the spacing between the control shaft abutments 33, 34. It can thus be seen that with the parts positioned as illustrated in FIG. 7, the primary spring 25 exerts pressure between the end member 27 and the control spring abutment 34 so as to keep the links 21 loaded in tension. This develops a clockwise torque about the hinge pin 15 and swings the tool sections 13, 14 into axial alinement with the section 12. The movement of the control shaft 30 downwardly from its illustrated position in FIG. 7 brings the abutment 33 into engagement with the collar 31 so as to lift the collar from the end member 27. Substantially simultaneously, the abutment 34 lowers the collar 32 onto the end member 28 and the abutment 34 moves away from the collar 32. In this position of the parts, the primary spring 25 exerts pressure between the control shaft abutment 33 and the end member 28 so that the links 21 are loaded in compression. This develops the counterclockwise torque about the hinge pin 15 that swings the base and end sections 13, 14 of the tool 10 into the configuration illustrated in FIG. 1. Since the spacing between the abutments 33, 34 and the end members 27, 28, is approximately equal, the changeover from development of compression to tension in the links 21 is accomplished with maximum smoothness.

The links 22 are connected to the control shaft 30 through a one-way connection biased by the secondary spring 26. In the illustrated construction, the links 22 are pivoted on a block 37 that is slidably fitted in the end member 28. A threaded stud 38 is anchored in the end of the control shaft 30 and an elongated nut 39 is passed through the block 37 into threadable engagement with the stud 38. The spring 26 is recessed within the block 37 so as to be compressed between the block and the end of the control shaft. The secondary spring 26 thus urges the block 37 against the head of the nut 39. The end section 14 of the tool 10 is therefore free to rock clockwise about the hinge pin 16, with such rocking movement loading the links 22 in compression and sliding the block 37 against the force of the secondary spring 26 away from the head of the nut 39. The secondary spring thus maintains a counterclockwise torque on the end section 14 tending to urge it toward axial alinement with the intermediate section 13. Axial threadable adjustment of the nut 39 allows the one-way connection between the control shaft 30 and the end section 14 to be established so that, with the control shaft in its illustrated FIG. 7 position causing the links 21 to be compression loaded, the end section 14 is held in axial alinement with the base and intermediate sections 12, 13 of the tool.

To permit reliable operation of the tool 10 under extremely high fluid pressures, the intermediate section 13 is open to the environment in the bore hole with holes such as the hole 41 shown in FIG. 4 being provided through the end members 27, 28 into the region within the tube 29. In this way, the axially slidable elements associated with the primary and secondary springs 25, 26 are pressure balanced and substantially unaffected by the extremely high fluid pressures encountered in the bore hole.

The motor 24 which is effective to reverse the loading in the links 21 and thus shift the tool 10 from its operating FIG. 1 position to its axially alined FIG. 7 position is mounted in the base section 12 on a frame plate 45. The plate 45 is part of an internal frame within the section 12 that is made up of another plate 46, spacers 47 and 48, and a block 49, all secured together by long bolts 50 to an end member bulkhead 51 forming, along with a tube 52, the illustrated portion of the body of the base section 12.

A drive screw 55 is axially fixed in thrust bearings 56 seated in the frame plate 46 and the block 49. Pinions 57 and gears 58 rotatably couple the motor 24 to the drive screw 55. A nut member 59 is threadably mounted on the drive screw.

The links 21 are pivoted to the outer end of an actuator rod 61 that is sealed in sliding relation through the bulkhead 51. The inner end of the actuator rod 61 is received in a cylinder 62 formed in the block 49. A pair of rods 63, which slidably pass through the block 49, couple the nut member 59 to a flange member 64 held by clips in an axially fixed position on the rod 61. It can thus be seen that energization of the motor 24 rotates the screw 55 through the pinions 57 and gears 58 so that the nut member 59 is rotatably moved along the length of the screw. Movement of the nut member 59 is transmitted through the rods 63 to the flange member 64 so as to slide the actuator rod 61 and thus, through the links 21, position the control shaft 30.

Preferably, the actuator rod 61 is formed with a central passage 65 that extends from the exterior of the base section 12 to the cylinder 62. In this way, the actuator rod 61 is pressure balanced and extremely high fluid pressure existing in the bore hole externally of the tool 10 will not create an unbalanced loading opposing operation of the motor 24. The drive screw 55 gives the nut member 59 a sufficient range of movement to insure positioning of the control shaft 30 through a range of movement that is effected to reverse the loading in the links 21.

As a further feature of the invention, a simple and reliable proximity sensing device is mounted in the end section 14. The end section includes an outer tube 70 sealed by an end member 71 which receives the hinge pin 16 and the pivotal connection of the links 22. The end member 71 is formed with a recess 72 that is open to the side of the tool on which the gamma ray source 20 and the detector 18 are mounted. A lever 73 is pivoted on a pin 74 within the recess 72 and a roller 75 is journaled on the free end of the lever 73. A spring 76 biases the lever 73 so that the periphery of the roller 75 extends from the recess 72 to ride along the side wall of the bore hole in which the tool 10 operates. To minimize friction, the spring 76 is seated on a collar 77 and the collar 77 acts on the lever 73 through a ball 78 which is trapped in a depression in the lever.

The sensing instrumentality is preferably a variable potentiometer 79. The potentiometer 79 includes a control lever 81 which is connected to the roller lever 73 by a small diameter rod 82 that passes through a seal 83. Sealing the potentiometer 79 within the end member 71 protects the electrical circuit of the proximity device and since only a small diameter rod 82 passes into the sealed region from the external portion of the tool, there is very little pressure effect on the proximity sensing device.

The tool 10 is physically supported, and electrical circuits are established between the tool and the ground surface, by a cable, not shown, connected to the upper end of the base section 12 of the tool. The cable leads extend to the interior of the tool section 12 and pass through a pressure resisting bulkhead plug 90 (see FIGS. 6 and 8) in the end of the section 12 that is adjacent the intermediate section 13. The section 12 is sealed against external fluid pressure except for the cylinder 62 referred to above.

The electrical leads pass freely into the intermediate section 13 which, as described above, is open to the fluids in the bore hole through the provision of holes 41 in the end members of the section. A suitable bulkhead plug and electrical connections, including a connection assembly 91 (see FIG. 2), is provided in the end section 14 to establish electrical interconnections to the potentiometer 79 and the gamma ray detector 18 within the body of the end section 14.

It can now be readily seen that the tool 10 is well suited for making gamma-gamma density logs. When in alined condition, the tubular body of the tool can be kept within the maximum 3⅝" diameter usually desired for free movement of tools of this kind into bore holes. Remote operation of the motor 24 changes the loading in the links 21 from tension to compression so as to swing the sections 12–14 of the tool into the operating positions illustrated in FIG. 1. When so disposed, the gamma ray source and the detector are held adjacent to the wall of the bore hole and this position is maintained even though the width of the hole varies and the contour of the hole wall against which the end section 14 is pressed alters its slope.

It is particularly important to note that the end section 14 containing the gamma ray source and detector apparatus is controlled entirely from its upper end. This makes available the entire interior of this section for suitable shielding to prevent direct radiation leaks. In addition, there are no moving parts in the immediate vicinity of the gamma ray source and detector which could affect the radiation levels sensed by the apparatus. The proximity detector utilizing the free running roller 75 provides a reliable check of the proper positioning of the end section 14 and electrical readings resulting from variations in the position of the potentiometer 79 allow suitable corrections to be made in the gamma ray detection log.

Those familiar with this art will also appreciate that the design of the tool 10 is well suited for heavy duty, field operations and for effective use in the extremely high pressures, on the order of 20,000 p.s.i., encountered in bore holes. The critical parts are protected from the extreme pressures and elements which necessarily must move into and out of the surrounding fluids are pressure balanced or, in the case of the proximity device, constructed so as to evidence a minimum pressure effect.

I claim as my invention:

1. A logging tool comprising, in combination, an instrument body section adapted to contain sensing devices, an intermediate section alined with and pivoted at one end to an end of said body section, a base section alined with and pivoted to the other end of said intermediate section, means interconnecting said base section and said intermediate section for biasing the intermediate section out of axial alinement with the base section, and means including a spring interconnecting said intermediate section and said body section for resiliently urging the body section toward axial alinement with said intermediate section.

2. A logging tool comprising, in combination, an instrument body section adapted to contain sensing devices, an intermediate section alined with and pivoted at one end to an end of said body section, a base section alined with and pivoted to the other end of said intermediate section, a cradle member fixed on said base section and extended longitudinally thereof so as to form an alined extension of the base section adapted to receive said intermediate section, means including a spring interconnecting said base section and said intermediate section for biasing the intermediate section out of axial alinement with the base section, and means interconnecting said intermediate section and said body section for resiliently urging the body section toward axial alinement with said intermediate section.

3. A logging tool comprising, in combination, an instrument body section adapted to contain sensing devices, an intermediate section alined with and pivoted at one end to an end of said body section, a base section alined with and pivoted to the other end of said intermediate section, means interconnecting said base section and said intermediate section for biasing the intermediate section out of axial alinement with the base section, means including a spring interconnecting said intermediate section and said body section for resiliently urging the body section toward axial alinement with said intermediate section, and a sensing element in said body section projecting therefrom in the direction in which said section is biased for measuring proximity of the section to a surface by displacement of the element.

4. A logging tool comprising, in combination, an instrument body section adapted to contain sensing devices, an intermediate section alined with and pivoted at one end to an end of said body section, a base section alined with and pivoted to the other end of said intermediate section, means interconnecting said base section and said intermediate section for biasing the intermediate section out of axial alinement with the base section, means including a spring interconnecting said intermediate section and said body section for resiliently urging the body section toward axial alinement with said intermediate section, and means including a motor in said body section for selectively pulling said sections into axial alinement against said biasing force.

5. A logging tool comprising, in combination, an elongated tubular body having base, intermediate and end sections alined and hinged together in a common plane, the base and end sections being hinged for articulation in opposite directions from the axis of the intermediate section, means including a primary spring in said body for resiliently deflecting said intermediate and end sections from the axis of said base section, and means including a secondary spring in said body for biasing said end section toward axial alinement with said intermediate section, said primary spring being effective to exert a greater force than said secondary spring so that the base and end sections are urged into generally parallel relation when the tool is confined in a hole.

6. A logging tool comprising, in combination, an elongated tubular body having base, intermediate and end sections alined and hinged together, means including a primary spring in said body for resiliently deflecting said intermediate and end sections from the axis of said base section, means including a secondary spring in said body for biasing said end section toward axial alinement with said intermediate section, said primary spring being effective to exert a greater force than said secondary spring so that the base and end sections are urged into generally parallel relation when the tool is confined in a hole, and means including a motor in said body for selectively pulling said sections into axial alinement against said biasing force.

7. A logging tool comprising, in combination, an elongated tubular body having base, intermediate and end sections alined and hinged together in a common plane, the base and end sections being hinged for articulation in opposite directions from the axis of the intermediate section, a cradle member fixed on said base section and extended longitudinally thereof so as to form an alined extension of the base section adapted to receive said intermediate section, means including a primary spring in said body for resiliently deflecting said intermediate and end sections from the axis of said base section, and means including a secondary spring in said body for biasing said end section toward axial alinement with said intermediate section, said primary spring being effective to exert a greater force than said secondary spring so that the base and end sections are urged into generally parallel relation when the tool is confined in a hole.

8. A logging tool comprising, in combination, an elongated tubular body having base, intermediate and end sections alined and hinged together, means including a primary spring in said body for resiliently deflecting said intermediate and end sections from the axis of said base section, means including a secondary spring in said body for biasing said end section toward axial alinement with said intermediate section, said primary spring being effective to exert a greater force than said secondary spring so that the base and end sections are urged into generally parallel relation when the tool is confined in a hole, and a sensing element in said end section projecting therefrom in the direction in which said section is biased for measuring proximity of the section to a surface by displacement of the element.

9. In a logging tool having base, intermediate and end sections alined and hinged together, the combination comprising, a motor mounted in said base section, a screw rotatably coupled to said motor and being axially fixed in said base section, a bulkhead forming a sealed end of said base section adjacent said intermediate section, an actuator rod sealed in said bulkhead for axial slidable movement, a link coupling the outer end of said rod to said intermediate section for pivoting said hinged base and intermediate sections, a nut on said screw, and means interconnecting said nut and said rod.

10. In a logging tool having base, intermediate and end sections alined and hinged together, the combination comprising, a motor mounted in said base section, a screw rotatably coupled to said motor and being axially fixed in said base section, a bulkhead forming a sealed end of said base section adjacent said intermediate section, an actuator rod sealed in said bulkhead for axial slidable movement, a link coupling the outer end of said rod to said intermediate section for pivoting said hinged base and intermediate sections, a block in said base section defining a cylinder slidably receiving the inner end of said rod, a nut on said screw, and means interconnecting said nut and said rod, said rod having a passage therethrough for pressure balancing the inner and outer ends of the rod.

11. In a logging tool having base, intermediate and end sections alined and hinged together, the combination comprising, an actuator rod shiftably mounted in the end of said base section adjacent said intermediate section, said intermediate section having spaced opposite end members, a helical primary spring compressed between said end members, a control shaft slidably mounted in said end members for movement axially of said primary spring, means including abutments on said control shaft for engaging the opposite ends of said primary spring upon axial movement of the shaft, and a link coupling said actuator rod and said control shaft so that shifting movement of said rod slides the shaft and changes the force of said spring from one end member and the shaft to the other end member and the shaft.

12. In a logging tool having base, intermediate and end sections alined and hinged together, the combination comprising, an actuator rod shiftably mounted in the end of said base section adjacent said intermediate section, said intermediate section having spaced opposite end members, a helical primary spring compressed between said end members, a control shaft slidably mounted in said end members for movement axially of said primary spring, means including abutments on said control shaft for engaging the opposite ends of said primary spring upon axial movement of the shaft, a link coupling said actuator rod and said control shaft so that shifting movement of said rod slides the shaft and changes the force of said spring from one end member and the shaft to the other end member and the shaft, means including a second link establishing a one-way connection between said control shaft and said end section, and a secondary spring in said intermediate section tensioned between said second link and said control shaft so that said hinged end section is resiliently held at the position established by said one-way connection.

13. In a logging tool having base, intermediate and end sections alined and hinged together, the combination comprising, a motor mounted in said base section, a screw rotatably coupled to said motor and being axially fixed in said base section, a bulkhead forming a sealed end of said base section adjacent said intermediate section, an actuator rod sealed in said bulkhead for axial slidable movement, a link coupling the outer end of said rod to said intermediate section for pivoting said hinged base and intermediate sections.

References Cited

UNITED STATES PATENTS

| | | | |
|---|---|---|---|
| 2,497,990 | 2/1950 | Huber et al. | 33—178 |
| 2,789,357 | 4/1957 | Schramm | 33—178 |
| 2,812,587 | 11/1957 | Roussin | 33—178 |
| 3,023,507 | 3/1962 | Camp | 33—178 |
| 3,060,588 | 10/1962 | Lanmon et al. | 33—178 |
| 3,254,221 | 5/1966 | Saurenman | 250—83.6 |

LEONARD FORMAN, *Primary Examiner.*

SAMUEL S. MATTHEWS, *Examiner.*